United States Patent [19]
Suita et al.

[11] Patent Number: 6,072,145
[45] Date of Patent: Jun. 6, 2000

[54] SPOT WELDING APPARATUS AND A METHOD FOR CONTROLLING THE APPARATUS

[75] Inventors: Kazutsugu Suita, Toyota; Yoshitaka Sakamoto, Nagoya; Seiji Suzuki, Toyota, all of Japan

[73] Assignee: Toyota Jidosha Kabushiki Kaisha, Toyota, Japan

[21] Appl. No.: 08/888,131

[22] Filed: Jul. 3, 1997

[30] Foreign Application Priority Data

Jul. 4, 1996 [JP] Japan .................................. 8-174529
Jun. 25, 1997 [JP] Japan .................................. 9-168546

[51] Int. Cl.$^7$ .................................................. B23K 11/00
[52] U.S. Cl. ...................................... 219/110; 219/86.41
[58] Field of Search ................................ 219/110, 108, 219/86.41, 86.51, 86.61, 86.7, 86.25; 901/42

[56] References Cited

U.S. PATENT DOCUMENTS

H703    11/1989 Repperger et al. .
3,727,822 4/1973 Umbaugh .............................. 219/110
5,582,747 12/1996 Sakai et al. ......................... 219/86.41

FOREIGN PATENT DOCUMENTS 7-144283  6/1995  Japan .

Primary Examiner—Clifford C. Shaw
Attorney, Agent, or Firm—Pillsbury Madison & Sutro LLP

[57] ABSTRACT

A spot welding apparatus having a pressing axis to which a mechanical impedance control device is provided. The mechanical impedance control device includes a welding condition instruction device, a pressing axis control device, and a mechanical impedance calculation device. A method for controlling the spot welding apparatus, wherein for welding relatively thin plates, the mechanical impedance is controlled to be low, and for welding relatively thick plates, the mechanical impedance is controlled to be high.

9 Claims, 6 Drawing Sheets

FIG. 5
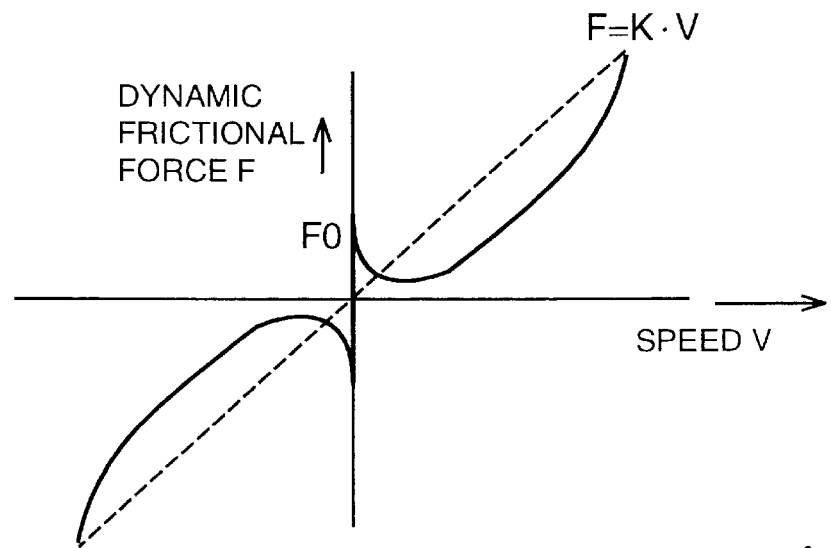
FIG. 6(a)   FIG. 6(b)
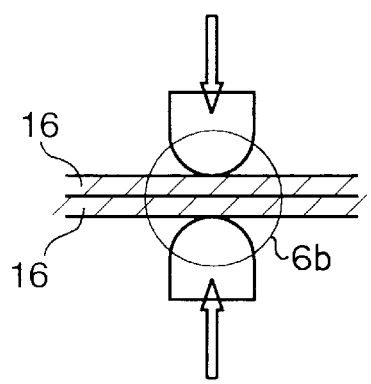 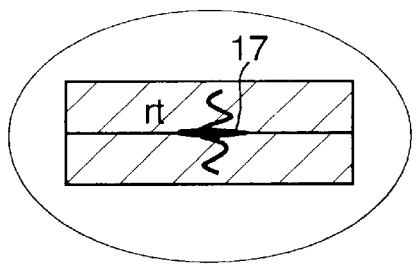
FIG. 7(a)   FIG. 7(b)
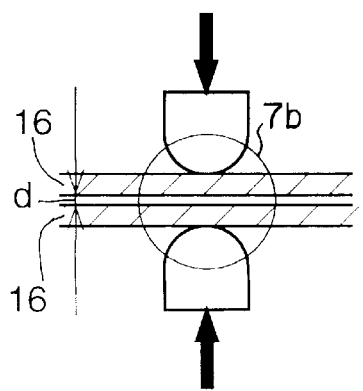 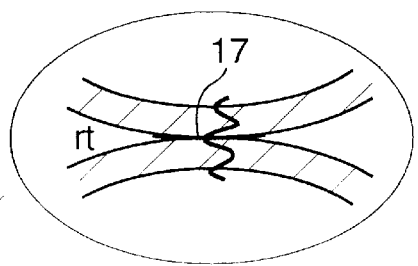

SPOT WELDING APPARATUS AND A METHOD FOR CONTROLLING THE APPARATUS

This application is based on application Nos. HEI 8-174529 filed in Japan on Jul. 4, 1996 and HEI 9-168546 filed in Japan on Jun. 25, 1997, the contents of which are incorporated herein by reference.

BACKGROUND OF THE INVENTION

1. Field of the Invention

The present invention relates to a spot welding apparatus where the mechanical impedance of the apparatus before and during welding is controllable and a method for controlling the welding apparatus.

2. Description of Related Art

Japanese Patent Publication No. HEI 7-144283 discloses a method for controlling a pressing axis drive actuator of a spot welding apparatus. More particularly, the Publication discloses a method for determining a static pressing force and a feed back control for accurately controlling the static pressing force.

However, the conventional spot welding apparatus and the control method therefor have the following problems:

(a) Problems before Welding

In welding relatively thick workpieces to each other, it is difficult to ensure that the workpieces contact each other at the entire opposed surfaces thereof and a gap tends to form between the workpieces, since the workpieces have a relatively high rigidity. If a clamping mechanism contacts the workpieces at a low impedance, the workpieces cannot contact each other. As a result, an optimum welding electrical current density and a sufficient contact stress are not obtained thereby degrading the welding quality.

In welding relatively thin workpieces to each other, a problem opposite to that of the above-described problem occurs. More particularly, since the thin workpieces have a low rigidity, if the contact impedance is not decreased, the contact area will be too large, which is accompanied by a great decrease in the welding electrical current density and detachment of the workpieces at the weld.

(b) Problems During Welding

In thermal expansion and shrinkage of the workpieces, the mechanical impedance greatly affects the welding conditions (pressing force, welding electrical current, and welding time period) and the welding quality.

More particularly, in the case of a low impedance of the welding clamp mechanism, though at an early stage of the spot welding the contact area is small and a sufficient welding electrical current density is obtained, at a nugget generating stage of the spot welding the expansion and shrinkage of the workpieces cannot be sufficiently restricted and the contact area tends to become too small. As a result, the welding electrical current density becomes too large and dispersion of the melted material tends to occur.

In the case of a high impedance, an increase in the pressing force due to thermal expansion of the workpieces occurs. As a result, at an early stage of spot welding, the contact area becomes large which is accompanied by a decrease in the welding electrical current density, a decrease in the welding strength, and detachment of the workpieces at the weld. In order to increase the welding strength, it is necessary to increase the welding electrical current and the capacity of the electrical source.

SUMMARY OF THE INVENTION

An object of the present invention is to provide a spot welding apparatus where the welding condition can be controlled corresponding to a dynamic behavior during spot welding and a method for controlling the welding apparatus.

A welding apparatus according to the present invention includes a pressing axis having a variable mechanical impedance and an impedance control device provided to the pressing axis and constructed and arranged to control the mechanical impedance of the pressing axis.

The impedance control device includes: a welding condition instruction device constructed and arranged to determine a welding condition including an objective mechanical impedance value and an objective pressing force for each welding point based on information about the welding point and to issue the determined welding condition as instruction; a pressing axis control device constructed and arranged to control the pressing axis based on the instruction issued from the welding condition instruction device; and a mechanical impedance calculation device constructed and arranged to optimize the objective impedance value and the objective pressing force value sent from the welding condition instruction device based on measured positional values and measured pressing force values of the pressing axis driven by said pressing axis control device and to feed back the optimized impedance value and the optimized pressing force value to the welding condition instruction device.

There are a pair of pressing axes, and the impedance control device is provided for each of the pressing axes.

A method for controlling spot welding conducted using the spot welding apparatus includes the steps of: entering a mechanical impedance objective; and controlling a current mechanical impedance of the pressing axis so that the current mechanical impedance approaches the mechanical impedance objective. The mechanical impedance objective for a stage before welding is set at different values according to thicknesses of workpieces to be spot-welded such that the mechanical impedance objective is set at a small value for welding of relatively thin workpieces and the mechanical impedance objective is set at a large value for welding of relatively thick workpieces.

In the above-described spot welding apparatus and method, when the system including the pressing axis is deemed to be a vibrational system operating according to the following equation:

$$F(t)=I(d^2X/dt^2)+D(dX/dt)+KX$$

where,

F(t): a pressing force

I: an equivalent mass

D: an equivalent viscosity damping factor

K: an equivalent spring constant the mechanical impedance is defined as a physical quantity expressed by the factors I, D, and K. When the values of the factors are large, the mechanical impedance is high (which corresponds to a rigid spring if expressed in terms of a spring rigidity), and when the values of the factors are small, the mechanical impedance is low (which corresponds to a soft spring if expressed in terms of a spring rigidity).

In the above welding apparatus, since the mechanical impedance of the pressing axis is controllable by the impedance control device, welding at the optimum welding conditions is possible.

In the case where the impedance control device is provided for each of the pair of pressing axes, an equalizer does not need to be provided.

In the above welding method, optimum welding corresponding to the workpiece thicknesses is possible.

BRIEF DESCRIPTION OF THE DRAWINGS

The above and other objects, features, and advantages of the present invention will become apparent and will be more readily appreciated from the following detailed description of the preferred embodiment of the present invention in conjunction with the accompanying drawings, in which:

FIG. 5 is a graph illustrating a relationship between a dynamic frictional force and a velocity in the case where control of the mechanical impedance is conducted using a speed reducer;

FIG. 6(a) is a schematic cross-sectional view of workpieces having relatively thin thicknesses and spot-welded to each other;

FIG. 6(b) is an enlarged view of the spot welded workpieces 6(b) of FIG. 6(a).

FIG. 7(a) is a schematic cross-sectional view of workpieces having relatively thick thicknesses and spot-welded to each other;

FIG. 7(b) is an enlarged view of the spot welded workpieces 7(b) of FIG. 7(a).

DETAILED DESCRIPTION OF THE PREFERRED EMBODIMENT

Figure 1:
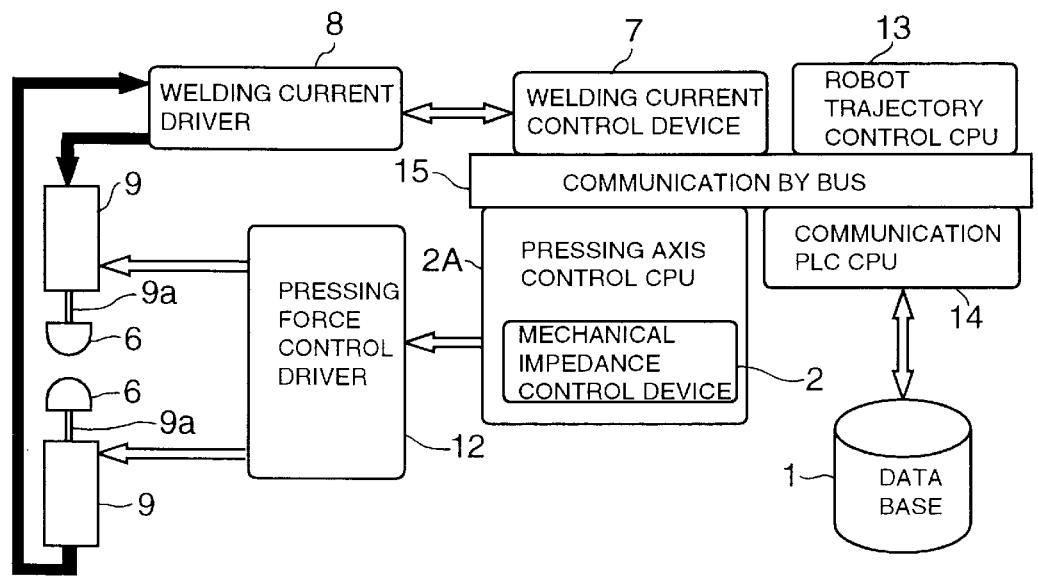
FIG. 1 is a system diagram of a spot welding apparatus according to one embodiment of the present invention.

As illustrated in FIG. 1, a spot welding apparatus according to one embodiment of the present invention includes a pressing axis 9a and a mechanical impedance control device 2 provided to the pressing axis 9a.

More particularly, the spot welding apparatus includes: a welding condition data base 1 which stores welding condition data about each welding point (data of thicknesses and materials of the workpieces at each welding point, and data of a pressing force objective, a welding electrical current objective, and a mechanical impedance objective at each welding time); a pressing axis control CPU (central processing unit) 2A including the impedance control device 2 therein; a welding current control CPU 7; a robot trajectory control CPU 13; a communication PLC (programmable logic control). CPU 14 constructed and arranged to control transmittal of data by a communication line between the welding condition data base 1 and each of the mechanical impedance control device 2, the welding current control CPU 7, and the robot trajectory control CPU 13; and a robot bus 15 constructed and arranged to transmit data at a high speed between the mechanical impedance control device 2, the welding current control CPU 7, the robot trajectory control CPU 13, and the communication PLC.CPU 14. The spot welding apparatus further includes: a pressing force control driver 12 constructed and arranged to drive the pressing axis 9a according to the instruction issued from the impedance control device 2; a drive actuator 9 connected to the pressing axis 9a; a pair of welding electrodes 6 connected to the pressing axis 9a; and a welding current driver 8 constructed and arranged to control welding current conducted through the welding electrodes 6.

Control of a mechanical impedance may be a mechanical control (see FIG. 2), which is used when the actuator 9 is a cylinder (air cylinder) or an electrical one (see FIG. 3), which is used when the actuator 91 is a servo motor.

Figure 2:
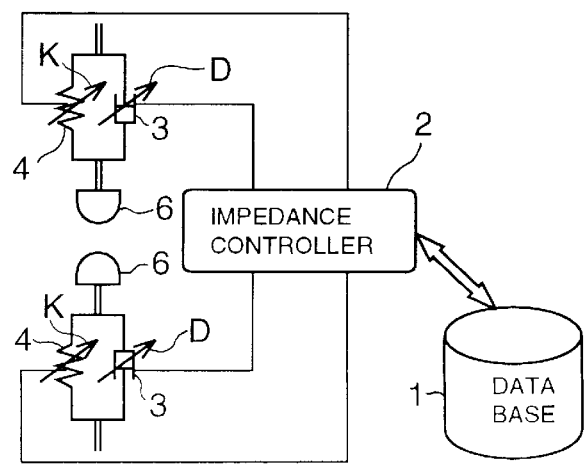
FIG. 2 is a schematic system diagram of an impedance controller when the impedance controller is a mechanical one.
Figure 3:
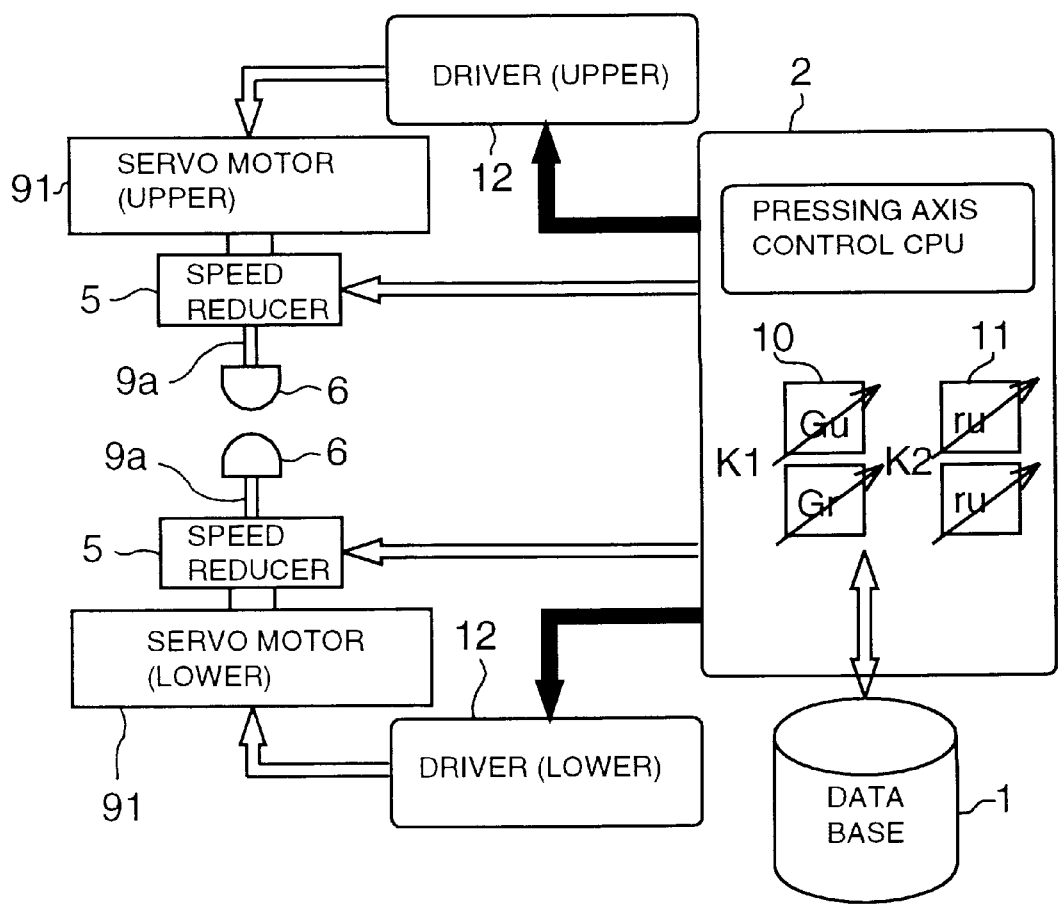
FIG. 3 is a schematic system diagram of an impedance controller when the impedance controller is an electrical one.

In the control apparatuses of FIGS. 2 and 3, an optimum or mechanical impedance objective data as well as the spring constant K (including an upper spring constant Ku and a lower spring constant Kl) and damping factor D are fed from the welding condition data base 1 to the controller 2 (which corresponds to the impedance control device 2 in FIG. 1). The impedance controller 2 controls the current mechanical impedance to the objective mechanical impedance before the electrode contacts the workpiece and while the welding electrical current is conducted.

The following are typical methods for controlling the mechanical impedance which can be used in the present invention.

(1) A mechanical variable damper 3 and a mechanical variable spring 4 are used. The mechanical impedance is controlled by changing the setting values of the damping factor D and the spring constant K. This method is used in an electrical control suspension.

(2) A servo motor is used. The mechanical impedance is controlled by changing the frictional characteristic of the speed reducer 5 of the servo motor. As illustrated in FIG. 5, the frictional characteristic depends on the rotational speed V. This means that the damping rate can be changed by changing the rotational speed. Therefore, by changing the combination of the gears of the speed reducer, the damping rate can be changed. More particularly, the frictional force F is a function of the speed V and can be expressed by the equation:

$$F = A\exp[-\lambda 1 \times V] + B\exp[\lambda 2 \times V] + F0 \times \text{sign}[V]$$

where, A, B, $\lambda 1$, $\lambda 2$ are constant,

F0 is a static frictional force, and sign [V] is +1 when the value of V is positive and −1 when the value of V is negative. When approximating the characteristic F (which is a full line in FIG. 5) by a linear function (a broken line in FIG. 5) having a slope D, the following equation holds:

$$F = D \times V$$

By selecting D, the damping rate can be controlled.

(3) In a system having an actuator 91 which includes a servo motor, as illustrated in FIG. 3, the mechanical impedance can be controlled by controlling the positional gain and speed gain of the servo motor 91. In this instance, the positional gain corresponds to the spring constant K, and the speed gain corresponds to the damping factor D.

More particularly, in the feed-back control of position and speed, there is the following relationship between the impedance and the pressing force F(t):

$$F(t) = K[Xd(t) - X(t)] + D[Vd(t) - v(t)]$$

where,

Xd(t): a position objective

Vd(t): a speed objective

X(t): a current position

V(t): a current speed

By controlling each gain K, D, the impedance can be controlled.

Control of the mechanical impedance may be conducted by using any one of the above methods (1), (2) and (3) or by combination of at least two of the above methods (1), (2) and (3). In the case where the above methods are combined, the impedance is a synthesis of each impedance.

The impedance control device 2 may be provided for both of the pressing axes of the pair or to only one of the pressing axes of the pair.

Figure 8:
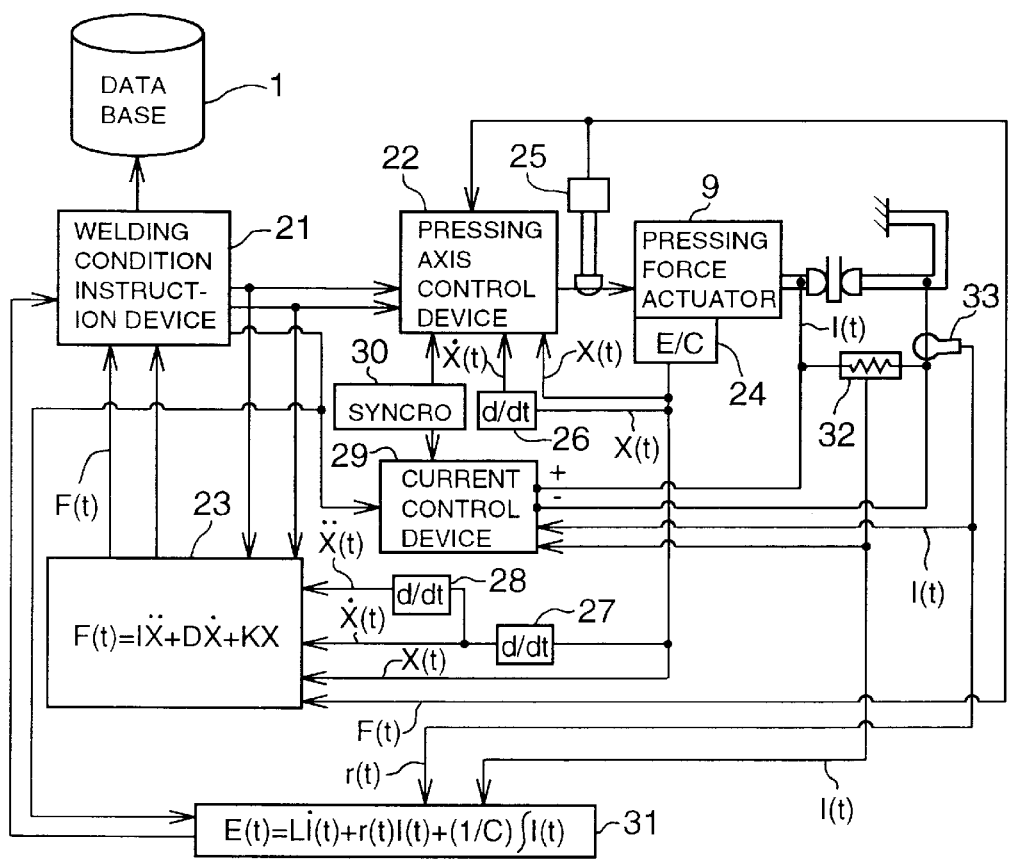
FIG. 8 is a diagram of a control system of the spot welding apparatus of FIG. 1.
Figure 9:
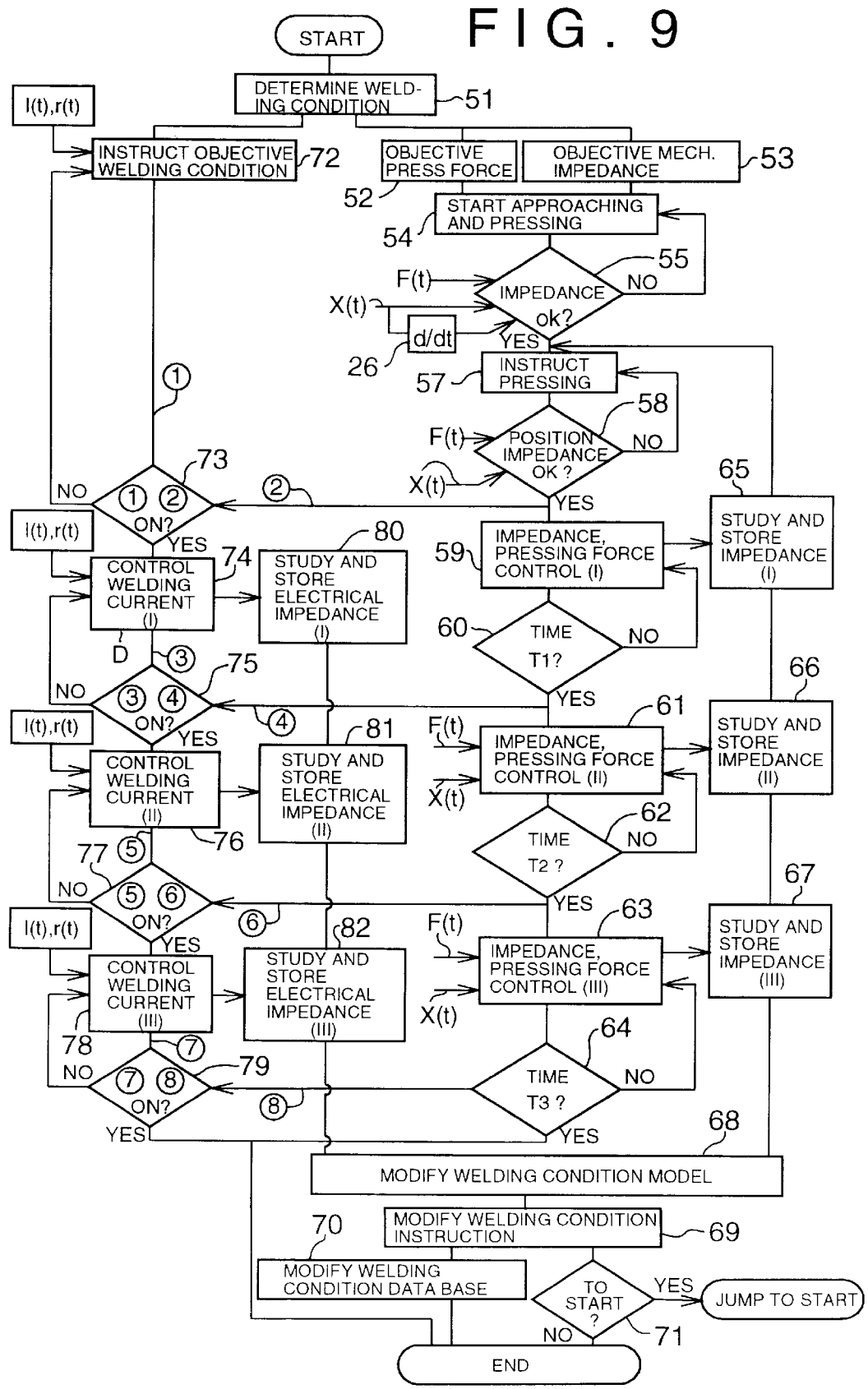
FIG. 9 is a flow chart of a method for controlling the spot welding apparatus according to one embodiment of the present invention.

FIGS. 8 and 9 illustrates the embodiment of the present invention in more detail.

As illustrated in FIG. 8, the spot welding apparatus according to the preferred embodiment of the present invention further includes a position detecting device 24 (for example, an encoder) for detecting a position of the electrode 6 driven by the actuator 9 or 91 (hereinafter, simply actuator 9) and a pressing force detecting device 25 (for example, a strain gauge attached to the pressing axis $9a$, or a servo motor electrical current sensor) for detecting the pressing force of the actuator 9.

The impedance control device 2 includes a welding condition instruction device 21, a pressing axis control device 22, and a mechanical impedance calculation device 23.

The welding condition instruction device 21 is constructed and arranged to determine a welding condition based on information (including an impedance value and a pressing force value) about a welding point and to issue an instruction. The welding condition instruction device 21 is connected to the welding condition data base 1 via the communication PLC.CPU 14.

The pressing axis control device 22 is constructed and arranged to control the pressing axis $9a$ based on the instruction issued from the welding condition instruction device 21. The pressing axis control device 22 receives the instruction from the welding condition instruction device 21 and feed-back signals from the position detecting device 24 and the pressing force detecting device 25 (a positional signal X(t) and a speed signal obtained as a differential of X(t) at a differentiator 56), and then controls the position of the electrode 6 driven by the actuator 9 and the pressing force of the actuator 9 so that the position of the electrode 6 and the pressing force of the actuator 9 approach the respective instruction values sent from the welding condition instruction device 21.

The mechanical impedance calculation device 23 is constructed and arranged to calculate the mechanical impedance value I, D, and K and the pressing force value F based on the current positional signal X(t) measured and sent from the position detecting device 24 and the current pressing force signal F(t) measured and sent from the pressing force detecting device 25 using the mechanical impedance calculation model and to optimize the mechanical impedance objective and the pressing force objective sent from the welding condition instruction device 21 so that the mechanical impedance objective and the pressing force objective approach the calculated mechanical impedance values I, D, and K and the calculated pressing force value F. Then, the mechanical impedance calculation device 23 feeds back the optimized mechanical impedance values I, D, and K and the optimized pressing force value F to the welding condition instruction device 21 which stores the values as the successive welding conditions. Reference numerals 27 and 28 in FIG. 8 illustrate a differentiator.

The spot welding apparatus according to the embodiment of the present invention further includes a welding current measurement device 33 for measuring the welding current conducted between the pair of electrodes 6 and an electrical resistance measurement device 32 for measuring the electrical resistance between the pair of electrodes 6.

The welding condition control device (CPU) 7 includes a welding condition instruction device 21, a welding current control device 29, a synchronizing device 30, and a welding current calculation device 31.

The welding condition instruction device of the impedance control device 2 is used in common for the welding condition instruction device 21 of the welding condition control device 7 utilizing communication by the bus 15.

The welding current control device 29 receives the instruction (objective welding current) from the welding condition instruction device 21 and a signal (the current welding electrical current) from the welding current measurement device 33 and a signal (the current electrical resistance) from the electrical resistance measurement device 32, and controls the welding current so that the welding current approaches the objective welding current.

The synchronizing device 30 is constructed and arranged to be provided between the pressing axis control device 22 and the welding current control device 29 and to synchronize the pressing axis control device 22 and the welding current control device 29 to each other.

The welding current calculation device 31 is constructed and arranged to calculate the electrical impedance and the welding current based on the current welding current signal I(t) measured by the welding current measurement device 33 and the electrical resistance r(t) measured by the electrical resistance measurement device 32 using an electrical impedance calculation model 31 and to optimize the electrical impedance objective and the welding current objective issued from the welding condition instruction device 21 so that the electrical impedance objective and the welding current objective issued from the welding condition instruction device 21 approach the calculated electrical impedance and the calculated welding current. Then, the welding current calculation device 31 feeds back the optimized electrical impedance and the optimized welding current to the welding condition instruction device 21 so that the welding condition instruction device 21 stores the optimized electrical impedance value and the optimized welding current value as the successive welding conditions.

Using the above-described spot welding apparatus, a method for controlling the spot welding apparatus according to an embodiment of the present invention is conducted as described below.

A mechanical impedance control before welding (before the welding current is conducted, and corresponding to ranges I and II in FIG. 4) is conducted as follows:

In a case of welding relatively thin workpieces, as illustrated in FIGS. 6($a$) and 6($b$), matching of the workpieces with each other while being pressed by the electrodes is good, and the contact area 17 of the workpieces is large. As a result, the welding electrical current density is small and detaching at the weld tends to occur. To prevent detaching, in the preferred embodiment of the present invention, the workpieces are contacted to each other in a relatively low mechanical impedance condition so that the contact electrical resistance rt is held at a large value. More particularly, a relatively small value is selected for the mechanical impedance objective Z1 in the ranges I and II in FIG. 4, and the impedance control is conducted according to the impedance objective Z1.

In a case of welding relatively thick workpieces, as illustrated in FIGS. 7($a$) and 7($b$), matching workpieces with each other while being pressed by the electrodes is not good, and the contact area 17 of the workpieces is small. As a result, the welding electrical current density is large and dispersion of melted metal at the weld tends to occur. To prevent the dispersion of melted metal, in the preferred embodiment of the present invention, the workpieces are contacted to each other in a relatively high mechanical impedance condition so that the contact electrical resistance rt and a gap between the workpieces are optimized. More particularly, a relatively large value is selected for the mechanical impedance objective Z1 in the ranges I and II in FIG. 4, and the impedance control is conducted according to the impedance objective Z1.

In the case of welding thick workpieces, it is preferable that a low electrical current is conducted through workpieces to be spot-welded for a predetermined time period after the electrodes have contacted the workpieces and before welding current begins to be conducted so that the workpieces generate heat and a good matching of the workpieces is obtained.

Figure 4:
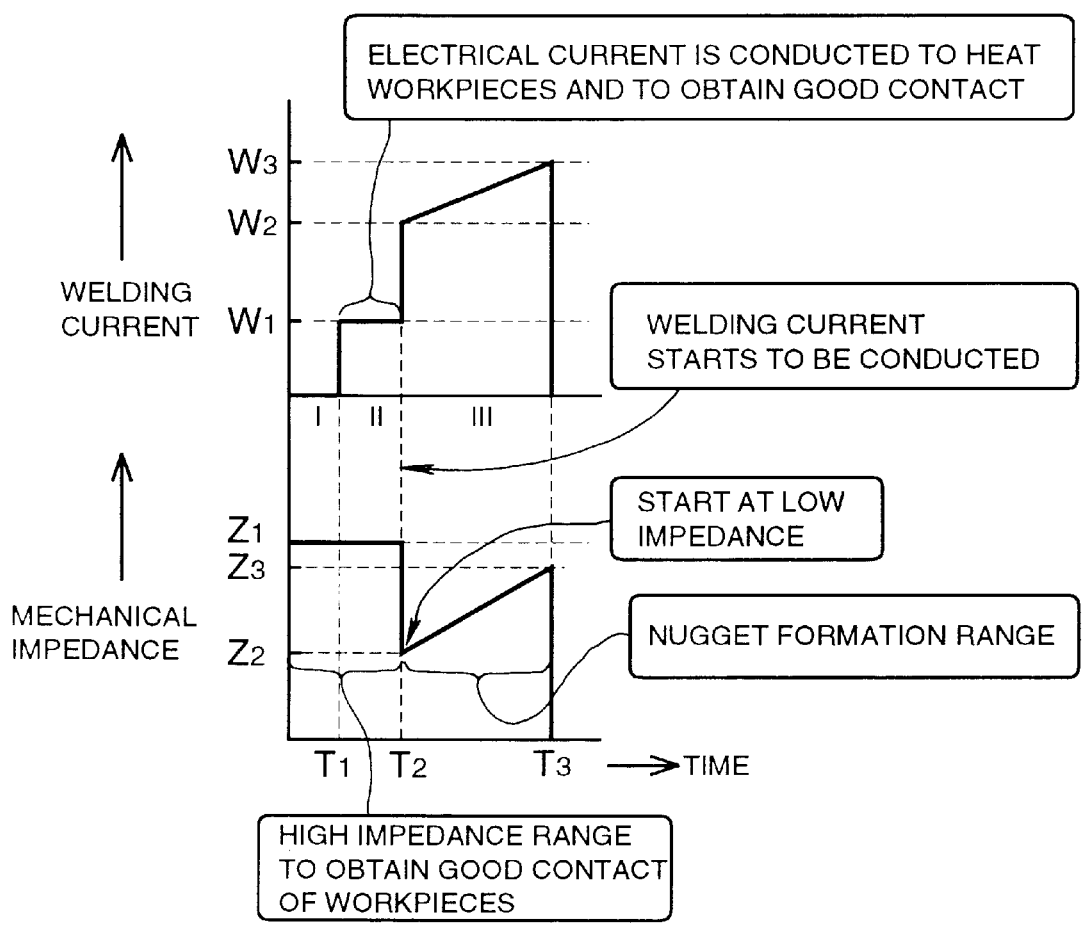
FIG. 4 is a graph illustrating a mechanical impedance objective and a welding electrical current objective.

A mechanical impedance control during welding (while the welding current is being conducted, and corresponding to the range III in FIG. 4) is conducted as follows:

As illustrated in FIG. 4, for an early stage of the welding, a relatively low mechanical impedance objective is set so as to ensure a relatively high welding electrical current density. A relatively small value is selected for the value Z2 in FIG. 4. In contrast, for a medium and later stage of welding (that is, a nugget growing period), the mechanical impedance objective is set so as to increase (Z3>Z2) with an elapse of time so that an internal stress increases and a contact area of the workpieces increases whereby an optimum welding electrical current density and a corona bond are obtained. The high impedance control enables the workpieces to follow the thermal shrinkage which occurs immediately after the welding.

FIG. 9 illustrates the method according to the preferred embodiment of the present invention in more detail in the form of a flow chart.

At step 51, the welding condition instruction device 21 enters the welding condition (thicknesses and materials of the workpieces, etc.) about each welding point from the welding condition data base 1. The welding condition instruction device 21 calculates and determines a pressing force objective, a mechanical impedance objective, and a welding current objective at each time before welding and during welding, and sets the determined values at steps 52, 53, and 72. FIG. 4 illustrates the welding current objective and the mechanical impedance objective. The steps 52 and 53 are on the side of the mechanical impedance control device (CPU) 2, and the step 72 is on the side of the welding current control device (CPU) 7.

Then, at step 54, the robot is operated to cause the electrodes 6 to approach the workpieces and to contact and press the workpieces. At step 55, based on the signals from the position detecting device 24, the differentiator 26 and the pressing force detecting device 25, the current mechanical impedance is calculated, and the calculated impedance is compared with the mechanical impedance objective. The cycle of steps 54 and 55 is repeated until it is determined at step 55 that the electrodes 6 begin to contact the workpieces. When it is determined at step 55 that the electrodes 6 begin to contact the workpieces, the routine proceeds to step 57 where pressing starts. At the same time, the mechanical impedance value at the contact beginning time which was calculated by the device 23 based on the measured values is fed back from the device 23 to the device 21, and at step 65, the feed-back value is stored in the device 21. This operation corresponds to the range I in FIG. 4.

Further, when the pressing instruction is issued at step 57, the routine proceeds to step 58, where it is determined whether the measured positional value X(t) measured by the device 24 and the measured pressing force value F(t) measured by the device 25 are substantially equal to the positional objective value and the pressing force objective value. This cycle of steps 57 and 58 is repeated until the measured values X(t) and F(t) are substantially equal to the objective corresponding values. When it is determined at sep 58 that the measured values X(t) and F(t) are substantially equal to the objective corresponding values, the routine proceeds not only to step 59 but also to step 73 via the synchronizing device 30.

At step 73, when both the welding current instruction signal from step 72 and the positional and pressing force OK signal from step 58 are received, the routine proceeds to step 74, where a welding current control I (corresponding to the range I in FIG. 4) is conducted wherein the welding electrical current is controlled to 0 (no electrical current). This electrical current value is fed back, at step 80, to the welding condition instruction apparatus where the data fed back is studied and stored.

At step 59, a current mechanical impedance is calculated and controlled at the mechanical impedance calculation device 23, and the calculation is repeated until the elapse of a time period T1 is confirmed at step 60. When the elapse of the time period T1 is confirmed at step 60, the signal of the elapse of the time T1 is sent by communication to step 75 and the routine proceeds to step 61. At step 61, control for the mechanical impedance and the pressing force for the range II in FIG. 4 is conducted. The controlled values are fed back to the welding condition instruction device 21 at step 66 and stored in the device 21 for the successive welding condition for the range II. The calculation and control at step 62 is repeated until the elapse of a time period T2 is confirmed at step 62.

At step 75, when both the welding current control signal from the step 74 and the time elapse signal from step 60 are received, the routine proceeds to step 76. At step 76, an electrical current control II (corresponding to the range II in FIG. 4) is conducted wherein an electrical current begins to be conducted so that the workpieces are heated. The controlled value is fed back, at step 81, to the welding condition instruction device 21 where the feed-back value is studied and stored.

When the elapse of the time period T2 is confirmed at step 62, the signal of the elapse of the time T2 is sent by communication to step 77 and the routine proceeds to step 63. At step 63, control for the mechanical impedance and the pressing force for the range III in FIG. 4 is conducted. The controlled values are fed back to the welding condition instruction device 21 at step 67 and stored in the welding condition instruction device 21 for the successive conditions for the range III. The calculation and control at step 63 is repeated until the elapse of a time period T3 is confirmed at step 64.

At step 77, when both the welding current control signal from the step 76 and the time elapse signal from step 62 are received, the routine proceeds to step 78. At step 78, a welding current control III (corresponding to the range III in FIG. 4) is conducted wherein the welding current begins to be conducted and the welding current control is conducted. The controlled value is fed back, at step 82, to the welding condition instruction device 21 where the fed back value is studied and stored.

When the elapse of the time period T3 is confirmed at step 64, or when it is confirmed at step 79 that operations at step 78 and 64 are finished, the routine proceeds to an End step.

When storing the mechanical impedance data at step 67 and storing the welding electrical current data at step 82 are finished, the routine proceeds to step 68. At step 68, the parameters (I, D, and K shown in the block 23 and L and C shown in the block 31 in FIG. 8) of the welding condition calculation model are modified to the values stored at steps 65, 66, 67, 80, 81, and 82, and then the instruction values of the welding condition instruction device 21 are modified. Then, at step 70, the data of the welding condition data base 1 are modified. Then, the routine proceeds from step 69 to step 71, and then returns to a START step. By this procedure, control at the welding point is finished.

At the successive welding point, the above-described procedure is repeated.

According to the present invention, the following technical advantages are obtained:

Since the mechanical impedance control device is provided to the pressing axis, the mechanical impedance can be dynamically controlled before and during welding so that the welding can be conducted under the optimum mechanical impedance condition. As a result, detachment at the welding point and the dispersion of the melted metal are effectively prevented and the welding strength is improved.

Since the mechanical impedance control device includes the welding condition data base, the welding condition instruction device, and the mechanical impedance calculation device, the instant mechanical impedance can be calculated such that it is optimized by the mechanical impedance calculation device calculations and the optimized data can be stored by the welding condition data base via the welding condition instruction device. As a result, the data are improved during welding so that the welding quality continues to increase.

In the case where the mechanical impedance control device is provided for each of the pair of the pressing axes, an equalizer does not need to be provided. As a result of removal of the equalizer, the welding robot can be made compact and light.

Since the mechanical impedance is controlled corresponding to the thicknesses of the workpieces in the method according to the present invention, detachment at the welding point and dispersion of the melted metal can be prevented, and the welding quality is improved.

Although the present invention has been described with reference to a specific embodiment, it will be appreciated by those skilled in the art that various modifications and alterations can be made to the particular embodiment shown without materially departing from the novel teachings and advantages of the present invention. Accordingly, it is to be understood that all such modifications and alterations are included within the spirit and scope of the present invention as defined by the following claims.

What is claimed is:

1. A spot welding apparatus comprising:
 a pressing axis having a variable mechanical impedance;
 a drive actuator connected to said pressing axis;
 a pair of welding electrodes connected to said pressing axis; and
 an impedance control device provided to said pressing axis constructed and arranged to control the mechanical impedance of said pressing axis, said impedance control device comprising:
  a welding condition instruction device constructed and arranged to determine a welding condition including a mechanical impedance objective value and a pressing force objective value for each welding point based on information about said each welding point and to issue the determined welding condition as an instruction;
  a pressing axis control device constructed and arranged to control said pressing axis based on the instruction issued from said welding condition instruction device; and
  a mechanical impedance calculation device constructed and arranged to optimize said mechanical impedance objective value and said pressing force objective value sent from said welding condition instruction device based on measured positional values and measured pressing force values of said pressing axis driven by said pressing axis control device and to feed back the optimized impedance value and the optimized pressing force value to said welding condition instruction device.

2. A spot welding apparatus according to claim 1, further comprising:
 a welding condition data base which stores welding condition data about said each welding point;
 a pressing axis control CPU including said impedance control device therein;
 a welding current control CPU;
 a robot trajectory control CPU;
 a communication PLC.CPU constructed and arranged to control transmittal of data by a communication line between said welding condition data base and each of said impedance control device, said welding current control CPU, and said robot trajectory control CPU;
 a robot bus constructed and arranged to transmit data at a high speed between said impedance control device, said welding current control CPU, said robot trajectory control CPU, and said communication PLC.CPU;
 a pressing force control driver constructed and arranged to drive said pressing axis according to the instruction issued from said impedance control device;
 a welding current driver constructed and arranged to control welding current conducted through said at least one welding electrode.

3. A spot welding apparatus according to claim 2 further comprising:
 a welding current measurement device.

4. A spot welding apparatus according to claim 3, further comprising:
 a welding condition instruction device for which said welding condition instruction device of said impedance control device is used in common by utilizing said bus, said welding condition instruction device issuing a welding condition including a welding current objective and an electrical impedance objective;
 a welding current control device constructed and arranged to control an instant welding current measured by said welding current measurement device so that the instant welding current approaches the welding current objective issued from said welding condition instruction device;
 a synchronizing device constructed and arranged to be provided between said pressing axis control device and said welding current control device and to synchronize said pressing axis control device and said welding current control device; and
 a welding current calculation device constructed and arranged to calculate an instant welding current based on the current welding current value measured by said welding current measurement device using an electrical impedance calculation model, to optimize said welding current objective issued from said welding condition instruction device so that said welding current objective issued from said welding condition instruction device approaches the calculated welding current, and to feed back the optimized welding current to said welding condition instruction device so that said welding condition instruction device stores the optimized welding current as a successive welding condition.

5. A spot welding apparatus according to claim 1, wherein said pressing axis includes a pair of pressing axes, to each of which said impedance control device is provided.

6. A method for controlling spot welding conducted using a spot welding apparatus, which includes a pressing axis having a variable mechanical impedance and an impedance control device provided to said pressing axis constructed and arranged to control the mechanical impedance of said pressing axis, said method comprising the steps of:

entering an objective mechanical impedance; and controlling a current mechanical impedance of said pressing axis so that said current mechanical impedance approaches said mechanical impedance objective.

7. A method according to claim 6, wherein said mechanical impedance objective for a stage before welding is set at different values according to thicknesses of workpieces to be spot-welded such that said mechanical impedance objective is set at a first, small value for welding of relatively thin workpieces and said mechanical impedance objective is set at a second, large value larger than said first value for welding of relatively thick workpieces.

8. A method according to claim 7, wherein a low electrical current is conducted through workpieces to be spot-welded for a predetermined time period after electrodes have contacted said workpieces and before welding current begins to be conducted so that said workpieces generate heat.

9. A method according to claim 6 wherein said mechanical impedance objective for a stage during welding is caused to vary according to an elapse of time such that said mechanical impedance objective increases according to said elapse of time.

* * * * *